July 18, 1950  G. FARR  2,516,052
RETRACTABLE HEADLIGHT AND CLOSURE ASSEMBLY
Filed Oct. 17, 1946  2 Sheets-Sheet 1

INVENTOR.
Gray Farr
Barthel + Bugbee
ATTYS

July 18, 1950 G. FARR 2,516,052
RETRACTABLE HEADLIGHT AND CLOSURE ASSEMBLY
Filed Oct. 17, 1946 2 Sheets-Sheet 2
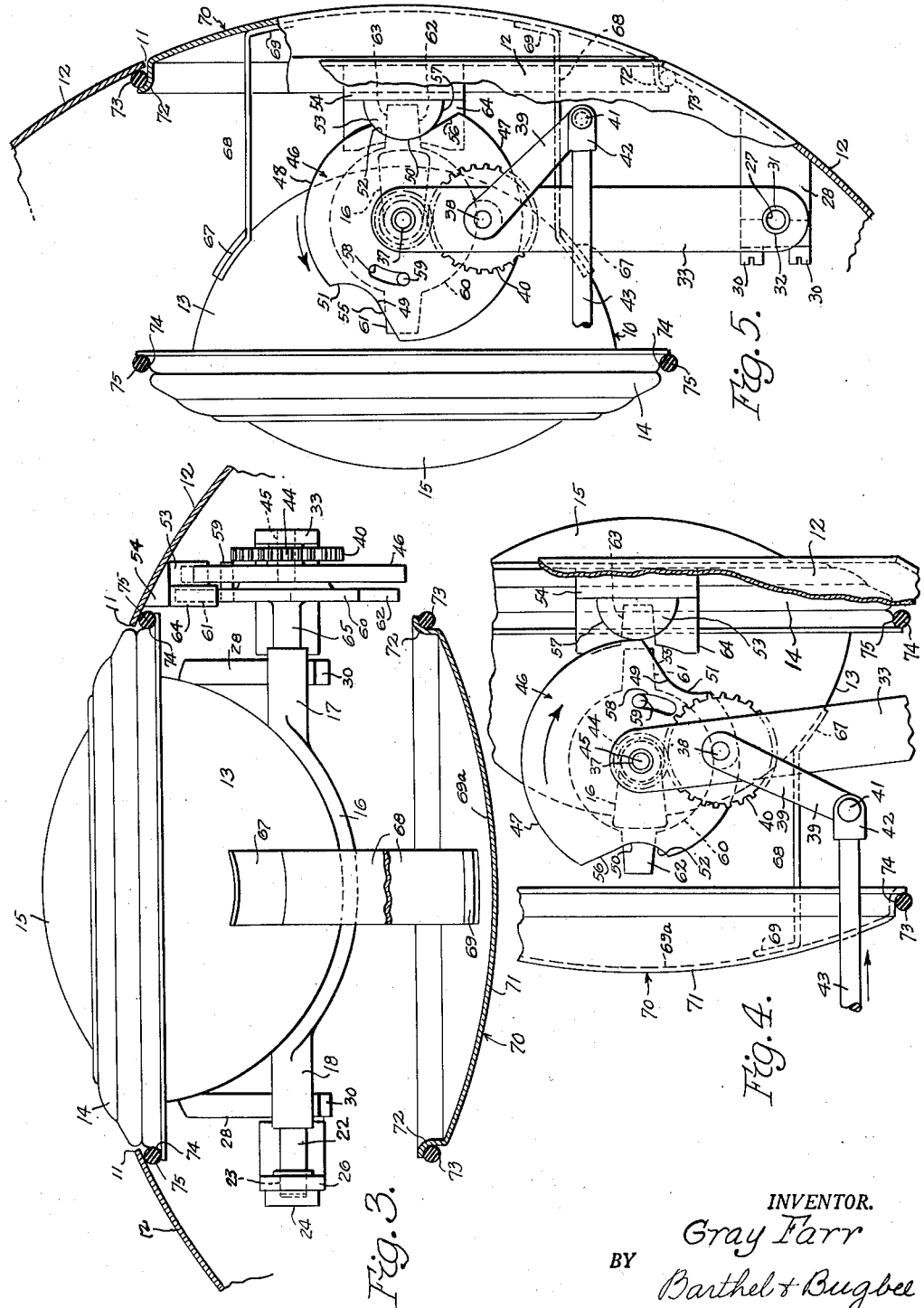
INVENTOR.
Gray Farr
BY Barthel + Bugbee
ATTYS Patented July 18, 1950

2,516,052

UNITED STATES PATENT OFFICE 2,516,052

RETRACTABLE HEADLIGHT AND CLOSURE ASSEMBLY

Gray Farr, Detroit, Mich.

Application October 17, 1946, Serial No. 703,754

10 Claims. (Cl. 240—7.1)

This invention relates to vehicle headlights, and in particular to retractible headlights.

One object of this invention is to provide a retractible vehicle headlight which is capable of being withdrawn from a headlight opening in a vehicle body or fender and replaced by a closure member which fills the space previously occupied by the headlight.

Another object is to provide a retractible vehicle headlight as set forth in the preceding object wherein the closure member fills the headlight opening in the vehicle body and forms a smooth and unbroken continuation thereof.

Another object is to provide a retractible vehicle headlight as set forth in the preceding objects wherein the headlight and closure member are mounted on a tiltable support and provided with mechanism whereby the headlight or closure member is first retracted a sufficient distance to withdraw it to a point where it is free from collision with the body or fender when it is tilted, the mechanism thereafter tilting the headlight substantially through 180° to present the closure member opposite the opening, whereupon the same mechanism moves the closure member forward into the opening.

Another object is to provide a retractible vehicle headlight as set forth in the preceding objects, wherein means is provided for guiding the headlight or closure plate into and out of the opening to prevent collision therebetween.

Another object is to provide a retractible vehicle headlight as set forth in the preceding objects, wherein the mechanism when operated in one direction retracts the headlight from the opening and moves the closure member into the opening, and when operating in the reverse direction, the mechanism retracts the closure member from the opening and returns the headlight into the opening.

Another object is to provide a retractible vehicle headlight, which will have the appearance of an ordinary headlight when filling the opening and which will leave no pockets, ridges, recesses or openings to collect dust, snow, water or debris when it is retracted from the opening.

Another object is to provide a retractible vehicle headlight, as set forth in the preceding objects, wherein the headlight and closure member are rigidly mounted as a unit on opposite sides of pivots which in turn are mounted upon a movable member permitting retraction of either the headlight or the closure member a predetermined distance before the assembly is tilted around the pivots and the closure member pushed into the opening previously occupied by the headlight.

Other objects and advantages of the invention will become apparent during the course of the following description of the accompanying drawings, wherein:

Figure 3 is a top plan view of the retractible headlight shown in Figures 1 and 2 with the fender and closure member in horizontal section substantially in the plane of the pivot axis;

Figure 1:
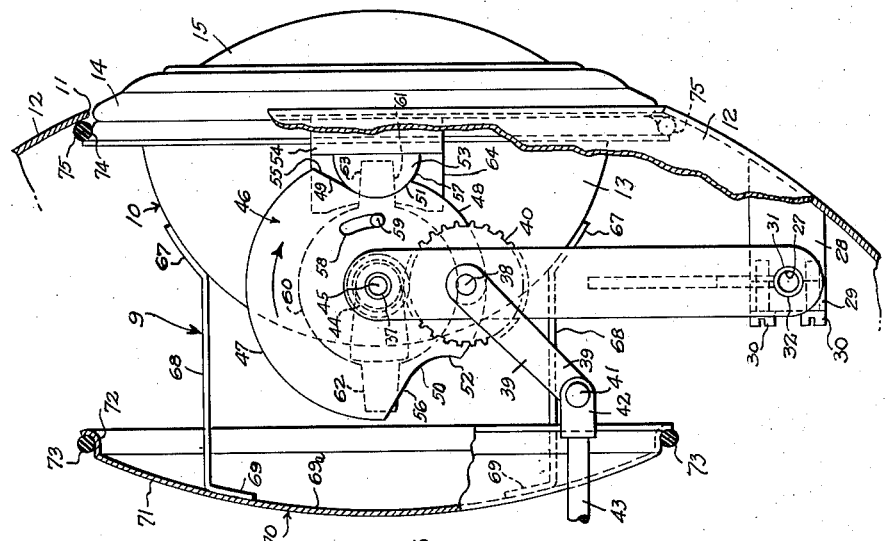
Figure 1 is a side elevation, partly in section, of a vehicle fender opening and a retractible headlight filling the opening, according to a preferred form of the invention.

Figure 4 is a fragmentary side elevation similar to Figure 1, but with the mechanism operated through a partial cycle to retract the headlight from the fender opening before tilting it; and Figure 5 is a side elevation similar to Figures 1 and 4, but showing the position of the various parts after the headlight has been retracted and tilted and the closure member has been moved into the opening previously occupied by the headlight.

Referring to the drawings in detail, Figure 1 shows a retractible headlight device generally designated 9 having a headlight unit 10 which is arranged to fit into an opening 11, usually circular, in a vehicle fender or body portion 12. The headlight unit 10 consists of a casing 13 of approximately hemispherical shape having an annular rim 14 and convex lens or glass 15 closing the casing 13. The casing 13 contains the usual conventional reflector and lamp structure (not shown), the details of which form no part of the present invention. It will be understood that any form of headlight may be installed in the casing 13, such as, for example, the well-known sealed-beam type of headlight.

Figure 2:
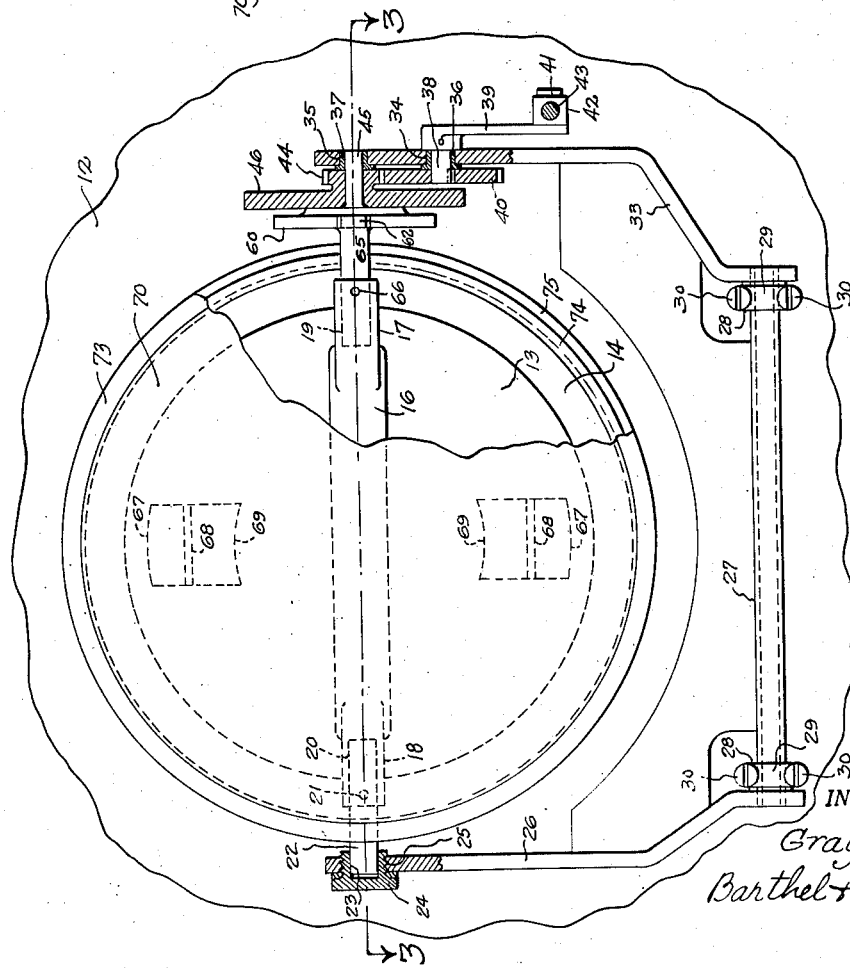
Figure 2 is a rear elevation, partly in section through the pivot axis, of the retractible headlight shown in Figure 1.

Secured to the rear surface of the headlight casing 13 (Figure 3) is an arcuate support 16 partially encircling the casing 13 and terminating in oppositely projecting bosses 17 and 18. The bosses 17 and 18 are provided with co-axial sockets 19 and 20 extending outward in opposite directions. Secured as by the pin 21 in the socket 20 is a pivot shaft 22 which is rotatably and pivotally mounted in a socket 23 within a threaded cap 24 threaded into a hole 25 in a bent arm 26, the lower end of which is mounted upon one end of a tubular shaft 27 (Figure 2). The tubular shaft 27 is rotatably mounted in bearing brackets 28 secured to the inner surface of the fender or body portion 12 (Figure 1) in spaced relationship therewith.

The bearing brackets 28 are provided with removable halves or blocks 29 secured thereto by the set screws 30 to facilitate the insertion and removal of the tubular shaft 27. The brackets 28 and the blocks 29 have cooperating half bores 31 and 32 which, when assembled, form bearing bores for the tubular shaft 27 (Figure 1).

Secured to the opposite end of the tubular shaft 27 is an upwardly extending bent arm 33 (Figure 2) having a pair of holes 34 and 35 therein for receiving flanged bearing bushings 36 and 37 respectively. Rotatably mounted in the bearing bushing 36 is a shaft 38 having a crank arm 39 pinned to the outer end thereof, and having a gear 40 keyed to the inner end thereof. Connected to the outer end of the crank arm 39 as by the pivot pin 41, is a clevis 42 attached to which is an operating rod 43. The crank arm 39 and operating rod 43 are shown solely for purposes of illustration since any source of power may be connected to rotate the shaft 38, such as a pneumatic, electric or hydraulic motor.

The gear 40 meshes with a pinion 44 mounted upon a shaft 45 journaled in the bearing bushing 37. The pinion 44 is directly connected to and preferably integral with a cam disc 46. The cam disc 46 has a periphery with two partially circular arcuate portions 47 and 48 which are concentric with the axis of the shaft 45 but which are of different radii of curvature, the portion 48 having a shorter radius of curvature than the portion 47. The portions 47 and 48 are separated from one another by inwardly curved peripheral notches 49 and 50, one portion 51 or 52 thereof being of substantially the same but opposite curvature to a fixed cam 53 which is of approximately semi-circular outline. The fixed cam 53 projects horizontally from a base 54 and is secured thereto, the base 54 in turn being secured to the fender or body portion 12 adjacent the opening 11 therein (Figures 1 and 3). The remaining portions 55 or 56 of the notches 49 and 50 are approximately straight and approximately tangential to the curved portions 51 or 52 of these notches, as clearly shown in Figure 1. The arcuate edge 57 of the fixed cam 53 thus substantially fits and mates with the curved portion 51 or 52 of the notches 49 or 50 when the headlight 10 or the closure associated therewith is in position closing the opening 11. The cam 46 is also provided with an arcuate slot 58 concentric with the axis of the shaft 45 and having an arcuate length subtending substantially the same angle from the axis of the shaft 45 (Figure 1) as the angle between the center of the arcuate edge 57 of the fixed cam 53 and the corner forming the junction between the straight portion 55 or 56 and the arcuate portion 47 of the cam 46. The slot 58 is engaged by a pin 59 passing therethrough (Figures 1 and 3) which is seated in an approximately circular disc-like member 60 which in turn is provided with a pair of diametrically-opposite radially-projecting guiding tongues 61 and 62, either of which is adapted to enter and mate with a correspondingly shaped guiding recess 63. The recess 63 is formed in a horizontally-projecting member 64 lying adjacent the fixed cam 53 and likewise secured to the base 54. The disc-like member 60 is connected to, and preferably integral with, a pivot shaft 65 which is pinned as at 66 in the socket 19 on the boss 17 projecting from the arcuate support 16.

Secured to the casing 13 at the top and bottom thereof (Figure 1) are the arcuate attachment portions 67 of the horizontally extending bracket arms 68, the opposite ends 69 of which are arcuate and are secured to the approximately spherical inner surface 69a of a closure member 70, the outer surface 71 of which is of approximately the same curvature as the outer surface of the fender or body portion 12. Thus the headlight unit 10 and closure unit 70 are secured unitarily to one another in an integral assembly and tilt bodily together substantially one-half revolution around the pivot shafts 22 and 65 as an axis. The rim of the closure member or unit 70 is curved to provide an annular recess 72 in which is seated an annular gasket 73 of elastic deformable material such as rubber or synthetic rubber. In a similar manner, the annular rim 14 outside the headlight lens 15 is provided with a curved annular recess 74 in which is seated a similar gasket 75 of elastic deformable material. The gaskets 73 and 75 tightly engage the inner surface of the body or fender portion 12 when the headlight unit 10 or the closure member 70 is in position closing the opening 11 in the fender or body portion 12.

In operation let it be assumed that the parts are in the position of Figure 1 wherein the headlight unit 10 is filling the opening 11 in the fender or body portion 12, and that it is desired to retract the headlight 10 and close the opening 11 with the closure member 70. To do this, power is applied to the rod 43, such as manually or by a hydraulic, pneumatic or electric motor, so as to swing the arm 39 and gear 40 in a counterclockwise direction.

When this occurs, the consequent rotation of the pinion 44 rotates the cam disc 46 into the position shown in Figure 4, wherein the notched portions 51 and 49 of the cam disc 46 engage the fixed cam 53 and push the cam disc 46 away from the fixed cam 53, swinging this assembly on the arm 33 around the tubular pivot shaft 27. While this is occurring, the guide tongue 61 slidably engages the guide recess 63 causing the headlight unit 10 to move rearwardly in a substantially horizontal line until the disc-like member 60 moves the pin 59 to the top of the arcuate slot 58.

At this point the periphery 47 of the cam disc 46 comes into engagement with the fixed cam 53 and the engagement of the pin 59 with the upper end of the arcuate slot 58 causes the disc-like member 60 to be rotated in a clockwise direction, as shown by the arrow in Figure 4, rotating the entire device 9 in a clockwise direction around the pivot shafts 22 and 65. The previous retraction of the headlight unit 10 by means of the inter-engagement of the tongue 61 and recess 63 has moved the rim 14 rearward a sufficient amount to prevent any part of it from colliding with any part of the fender or body portion 12, so that the entire unit 9 is free to tilt through a half revolution of the pivot shafts 22 and 65 into the position shown in Figure 5.

When the periphery 47 of the cam disc 46 has rotated sufficiently to bring the notch 50 adjacent the fixed cam 53, the closure member 70 starts to move toward the opening 11 in the fender or body portion 12 as the notch portion 56 slides along the edge of the fixed cam 53 and the latter seats itself in the curved notch portion 52. Meanwhile, the tongue 62 has entered the recess 63, preventing the closure member 70 from tilting as it nears the fender or body portion 12. The arm 33 then swings the entire assembly, guided by the inter-engagement of the tongue 62 and recess 63, until the gasket 73 on the rim 72 of the closure member 70 is firmly seated adjacent the opening 11 and the closure 70 substantially forms a smooth continuation of the fender or body portion 12. The parts have now reached the position shown in Figure 5.

When it is desired to retract the closure member 70 from the opening 11 and reinsert the headlight unit 10, the foregoing procedure is reversed. Power is applied to the rod 43 to swing the arm 39 and gear 40 in a clockwise direction, causing the cam disc 46 to rotate in a counterclockwise direction as shown by the arrow in Figure 5. Again, the engagement of the notch portions 52 and 56 of the notch 50 cause the cam disc 46 to push itself away from the fixed cam 53 until the latter engages the peripheral portion 48 of the cam disc 46, the arm 33 meanwhile swinging away from the opening 11. This action retracts the closure member 70 from the opening 11 in a horizontal direction insured by the engagement of the tongue 62 with the recess 63 until the upper end of the slot 58 reaches the pin 59.

When this occurs, the disc-like member 60 begins to move in a counterclockwise direction, tilting the closure member 70 upward through a half revolution, at the same time tilting the headlight unit 10 downward and forward until it arrives in the position shown in Figure 4 ready to enter the opening 11. As the notch portion 55 engages the fixed cam 53, the headlight unit 10 and arms 33 and 26 swing forward, the tongue 61 engaging the recess 63 to guide the headlight unit 10 substantially in a horizontal path into the opening 11 until its rim gasket 75 engages the body or fender portion 12. The parts are now in the position shown in Figure 1, with the headlight unit 10 fully in position filling the opening 11.

Thus, by means of the invention, either the headlight unit 10 or the closure member 70 may be moved into and out of positions filling the opening 11. During the daytime, the closure member 70 is employed to fill the opening 11 and seal it against the entrance of dust, rain, snow or other foreign material. When darkness arrives, however, the invention permits the operator to move the closure member 70 out of the opening 11 and replace it with the headlight unit 10, whereupon the headlights may be used in the normal manner for illuminating the path of the vehicle.

When the headlight unit 10 is in position filling and sealing the opening 11, the entire assembly has the appearance of an ordinary rigid headlight assembly, and there are no uncovered openings present at any time other than during the shifting operation previously described. Such uncovered openings have frequently been in prior shiftable headlights, admitting dust, rain and snow and thus not only detracting from the appearance of the vehicle, but also interfering with the operation of the headlight. Such foreign matter has often interfered so seriously with the operation of the headlight or closure member as to render one or the other inoperative. These defects have been completely overcome by the retractible headlight of the present invention.

It is to be understood that the word "body" as used in the accompanying claims, includes the vehicle fenders or any other part of the vehicle in which the opening for the headlight is formed, and that the word "headlight" similarly includes other lights used on a vehicle, such as fog lights, spot lights, tail lights and the like.

While I have shown and described my invention in detail, it is to be understood that the same is to be limited only by the appended claims, for many changes may be made without departing from the spirit and scope of my invention.

What I claim is:

1. A retractible headlight adapted to be mounted within a hollow vehicle body portion having a headlight opening, said headlight comprising a mount secured to the interior of said body portion, a movable support structure oscillatably mounted on said mount for motion toward and away from said opening, and a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening.

2. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, and a manually reciprocable operating member operably connected to said support structure.

3. A retractible headlight adapted to be mounted within a hollow vehicle body portion having a headlight opening, said headlight comprising a mount secured to the interior of said body portion, a movable support structure comprising spaced swinging arms tiltably mounted on said mount for motion toward and away from said opening, and a headlight unit and closure unit assembly having headlight and closure units secured integrally to one another, said assembly being pivotally and tiltably mounted on said support structure on an axis substantially parallel to the axis of tilt of said support structure, said headlight unit and said closure unit having rim portions shaped to closingly engage said body portion adjacent the edge of said opening.

4. A retractible headlight adapted to be mounted within a hollow vehicle body portion having a headlight opening, said headlight comprising a mount secured to the interior of said body portion, a movable support structure oscillatably mounted on said mount for motion toward and away from said opening, and a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, said closure unit and said headlight unit being mounted back to back relatively to one another in said assembly on a substantially common axis.

5. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, gearing rotatably mounted on said support structure and drivingly connected to said assembly, and a manually-actuated operating device drivingly and rotatably connected to said gearing.

6. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, a cam rotatably mounted on said support structure, a cam abutment member mounted on said body portion in engagement with said cam, and a manually-actuated operating device drivingly and rotatably connected to said cam.

7. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, gearing rotatably mounted on said support structure and drivingly connected to said assembly, a cam rotatably mounted on said support structure, a cam abutment member mounted on said body portion in engagement with said cam, and a manually-actuated operating device drivingly and rotatably connected to said cam and gearing.

8. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, gearing rotatably mounted on said support structure and drivingly connected to said assembly, a cam rotatably mounted on said support structure, a cam abutment member mounted on said body portion in engagement with said cam, and a manually-actuated operating device drivingly and rotatably connected to said cam and gearing, said cam having a pin and arcuate slot connection with said assembly.

9. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, and a guiding device having interengaging guide members connected to said assembly and body portion respectively and having approximately rectilinear surfaces adapted to guide said assembly in a substantially rectilinear path of motion immediately adjacent said opening.

10. A retractible headlight adapted to be mounted within a hollow vehicle body portion having a headlight opening, said headlight comprising a mount secured to the interior of said body portion, a movable support structure oscillatably mounted on said mount for motion toward and away from said opening, a headlight unit and closure unit assembly having headlight and closure units secured integrally to one another, said assembly being pivotally and tiltably mounted on said support structure on an axis transverse to the direction of motion of said support structure, said headlight unit and said closure unit having rim portions shaped to closingly engage said body portion adjacent the edge of said opening, and a guiding device having interengaging guide members connected to said assembly and body portion respectively and having approximately rectilinear surfaces adapted to guide said assembly in a substantially rectilinear path of motion immediately adjacent said opening, one of said guide members having a recess with inclined guide surfaces and the other guide member having a projection with inclined guide surfaces mating with and guidingly engaging said recess guide surfaces.

GRAY FARR.

REFERENCES CITED

The following references are of record in the file of this patent:

UNITED STATES PATENTS

| Number | Name | Date |
|---|---|---|
| 2,066,981 | Koca | Jan. 5, 1937 |
| 2,119,892 | Snow | June 7, 1938 |
| 2,284,538 | Parkes | May 26, 1942 |
| 2,312,005 | Smith | Feb. 23, 1943 |
| 2,338,541 | Roedding | Jan. 4, 1944 |
| 2,360,469 | Breer et al. | Oct. 17, 1944 |

FOREIGN PATENTS

| Number | Country | Date |
|---|---|---|
| 658,088 | Germany | Feb. 13, 1936 |